United States Patent
Hong et al.

(10) Patent No.: US 11,243,445 B2
(45) Date of Patent: Feb. 8, 2022

(54) DISPLAY DEVICE

(71) Applicant: SAMSUNG DISPLAY CO., LTD., Yongin-si (KR)

(72) Inventors: Sung Hwan Hong, Suwon-si (KR); Jae Bok Chang, Incheon (KR); Jun Woo Lee, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/674,039

(22) Filed: Nov. 5, 2019

(65) Prior Publication Data

US 2020/0241370 A1 Jul. 30, 2020

(30) Foreign Application Priority Data

Jan. 30, 2019 (KR) .......................... 10-2019-0011858

(51) Int. Cl.
*G02F 1/1362* (2006.01)
*G02F 1/135* (2006.01)

(52) U.S. Cl.
CPC ...... *G02F 1/136286* (2013.01); *G02F 1/1351* (2021.01); *G02F 1/136209* (2013.01); *G02F 1/136222* (2021.01); *G02F 2201/123* (2013.01)

(58) Field of Classification Search
None
See application file for complete search history.

(56) References Cited

U.S. PATENT DOCUMENTS

| | | | | |
|---|---|---|---|---|
| 6,781,651 B2 * | 8/2004 | Song | ................... | G02F 1/13458 349/111 |
| 7,839,473 B2 * | 11/2010 | Yoshida | ............ | G02F 1/133512 349/114 |
| 9,274,390 B2 | 3/2016 | Chang et al. | | |
| 10,438,977 B2 * | 10/2019 | Noh | .................. | H01L 29/78633 |
| 2002/0113936 A1 * | 8/2002 | Yanagawa | ............. | G02F 1/1303 349/155 |
| 2004/0141124 A1 * | 7/2004 | Kim | .................. | G02F 1/136286 349/126 |

(Continued)

FOREIGN PATENT DOCUMENTS

KR 10-2007-0028554 1/2008
KR 10-2003-0010022 4/2008

(Continued)

*Primary Examiner* — Ryan Crockett
(74) *Attorney, Agent, or Firm* — H.C. Park & Associates, PLC

(57) ABSTRACT

A display device according to an exemplary embodiment of the present invention includes: a substrate; a gate line that is disposed on the substrate in a first direction; a data line that is disposed in a second direction, while crossing the gate line; a semiconductor layer that is disposed between the gate line and the data line, a transistor formed by the semiconductor, a part of the gate line, and a part of the data line; a pixel electrode connected with the transistor; and a light blocking member that is disposed on the pixel electrode, wherein the light blocking member is disposed in the second direction while overlapping the data line, the light blocking member includes a first region and a second region, each having a different width in the first direction, and a width of the second region is narrower than a width of the first region.

20 Claims, 9 Drawing Sheets

(56) References Cited

U.S. PATENT DOCUMENTS

| | | | | |
|---|---|---|---|---|
| 2009/0219469 A1* | 9/2009 | Kim | ................... | G09G 3/3648 |
| | | | | 349/106 |
| 2014/0111749 A1* | 4/2014 | Won | ................ | G02F 1/136209 |
| | | | | 349/110 |
| 2016/0043104 A1* | 2/2016 | Li | ................... | G02F 1/134363 |
| | | | | 257/773 |
| 2016/0342058 A1* | 11/2016 | Park | ................ | G02F 1/133512 |
| 2017/0023839 A1* | 1/2017 | Han | ................ | H01L 29/78633 |
| 2017/0176822 A1* | 6/2017 | Yoon | ................ | G02F 1/133707 |
| 2020/0083255 A1* | 3/2020 | Li | ....................... | H01L 27/124 |

FOREIGN PATENT DOCUMENTS

| | | |
|---|---|---|
| KR | 10-2008-0024699 | 9/2013 |
| KR | 10-2017-0123384 | 11/2017 |
| KR | 10-2018-0081378 | 7/2018 |
| KR | 10-1879576 | 7/2018 |

\* cited by examiner

DISPLAY DEVICE

CROSS-REFERENCE TO RELATED APPLICATION

This application claims priority from and the benefit of Korean Patent Application No. 10-2019-0011858, filed on Jan. 30, 2019, which is hereby incorporated by reference for all purposes as if fully set forth herein.

BACKGROUND

Field

Exemplary embodiments of the invention relate generally to a display device, and more particularly, it relates to a display device in which breakage of an edge of a pixel electrode can be prevented or reduced.

Discussion of the Background

As one of widely used display devices, a liquid crystal display (LCD) is a display device in which a voltage is applied to electrodes (e.g., a pixel electrode and a common electrode) formed on respective substrates that face each other to control alignment of liquid crystals in a light crystal layer disposed between the electrodes, thereby adjusting the amount of transmitted light.

Such a light crystal display includes a thin film transistor connected with the electrodes. A thin film transistor is used as a switch that individually drives each pixel in the liquid crystal display.

Specifically, the thin film transistor is a switch that controls a data signal supplied to the pixel electrode through a data line according to a gate signal supplied through a gate line in each pixel, and includes a gate electrode connected with the gate line, an active layer (semiconductor layer) disposed on the gate electrode and forming a channel, a source electrode disposed on the active layer and connected with the data line, and a drain electrode disposed apart from the source electrode with reference to the active layer.

The above information disclosed in this Background section is only for enhancement of understanding of the background of the invention and therefore it may contain information that does not form the prior art that is already known in this country to a person of ordinary skill in the art.

SUMMARY

The invention has been made in an effort to provide a display device in which breakage of an edge of a pixel electrode can be prevented or reduced.

A display device according to an exemplary embodiment of the present invention includes: a substrate; a gate line that is disposed on the substrate in a first direction; a data line that is disposed in a second direction, while crossing the gate line; a semiconductor layer that is disposed between the gate line and the data line, a transistor formed by the semiconductor, a part of the gate line, and a part of the data line, a pixel electrode connected with the transistor; and a light blocking member that is disposed on the pixel electrode, wherein the light blocking member is disposed in the second direction while overlapping the data line, the light blocking member includes a first region and a second region, each having a different width in the first direction, and a width of the second region is narrower than a width of the first region.

The first region overlaps the gate line and the second region may overlap the transistor.

The second region of the light blocking member and the pixel electrode may be disposed apart from each other in the first direction, and a distance therebetween may be about 2 μm to about 10 μm.

A width of the first region of the light blocking member in the first direction may be 5% to 20% wider than a width of the second region in the first direction.

A width of the first region of the light blocking member in the first direction may be about 60 μm to about 70 μm.

A width of the second region of the light blocking member in the first direction may be about 50 μm to about 55 μm.

The second region of the light blocking member may not overlap one edge of the pixel electrode.

The pixel electrode may include a stem portion extending in the first direction and minute branch portions extended from the stem portion, and a length of the pixel electrode in the first direction may be longer than a length of the pixel electrode in the second direction.

The display device may further include an insulation layer disposed between the data line and the pixel electrode.

The insulation layer may be an organic layer, and a thickness of the insulation layer may be about 2 μm to about 3 μm.

The display device may further include a color filter disposed between the insulation layer and the data line.

A display device according to another exemplary embodiment of the present invention includes: a substrate; a gate line that is disposed on the substrate in a first direction; a data line that is disposed in a second direction, while crossing the gate line; a semiconductor layer that is disposed between the gate line and the data line, a transistor formed by the semiconductor, a part of the gate line, and a part of the data line, a pixel electrode connected with the transistor; and a light blocking member that is disposed on the pixel electrode, wherein the light blocking member is disposed in the second direction while overlapping the data line, and the light blocking member and the pixel electrode are disposed apart from each other in the first direction.

The distance apart may be about 2 μm to about 10 μm.

The display device may further include an insulation layer that is disposed between the data line and the pixel electrode.

The insulation layer may be an organic layer, and the insulation layer may have a thickness of about 2 μm to about 3 μm.

The display device may further include a color filter that is disposed between the insulation layer and the data line.

A display device according to another exemplary embodiment of the present invention includes: a substrate; a gate line that is disposed on the substrate in a first direction; a data line disposed in a second direction, while crossing the gate line; a semiconductor layer that is disposed between the gate line and the data line, a transistor formed by the semiconductor, a part of the gate line, and a part of the data line; a pixel electrode connected with the transistor; an insulation layer that is disposed between the transistor and the pixel electrode; and a light blocking member that is disposed on the pixel electrode, wherein a thickness of the insulation layer is about 2 μm to about 3 μm.

The display device may further include a color filter that is disposed between the insulation layer and the data line.

The insulation layer may be an organic layer.

The light blocking member and the pixel electrode may be disposed apart from each other in the first direction, and a distance therebetween may be about 2 μm to about 10 μm.

According to the exemplary embodiments, a display device of which breakage of an edge of a pixel electrode can be prevented or reduced can be provided.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
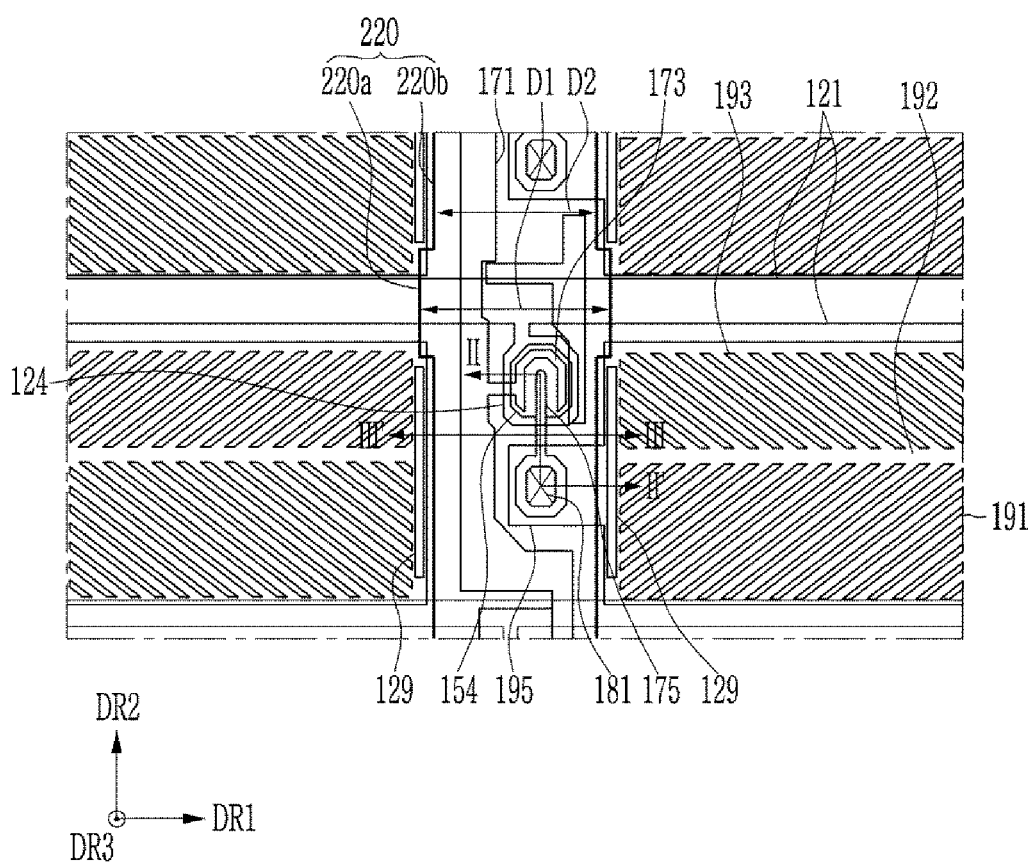
FIG. 1 is a top plan view of a display device according to an exemplary embodiment of the present invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the"

are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, a display device according to an exemplary embodiment will be described with reference to the accompanying drawings.

Figure 2:
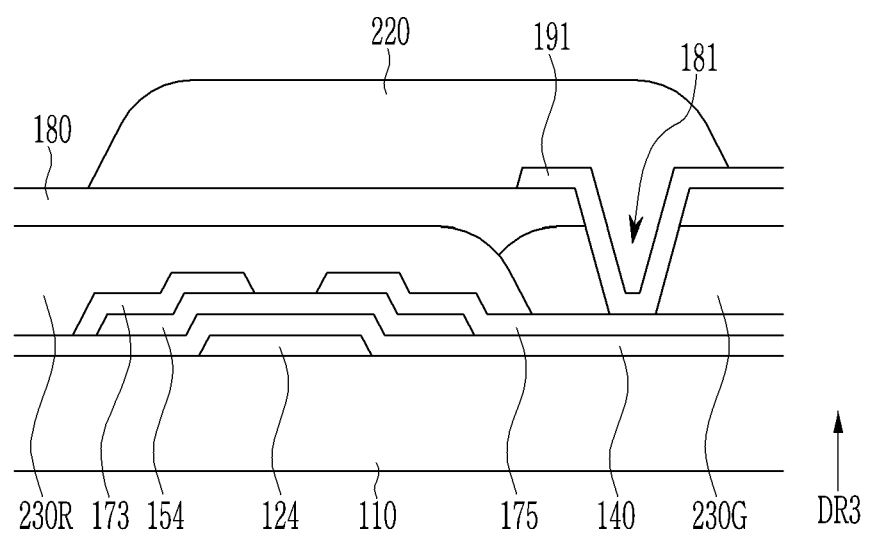
FIG. 2 is a cross-sectional view of FIG. 1, taken along the line II-II.
Figure 3:
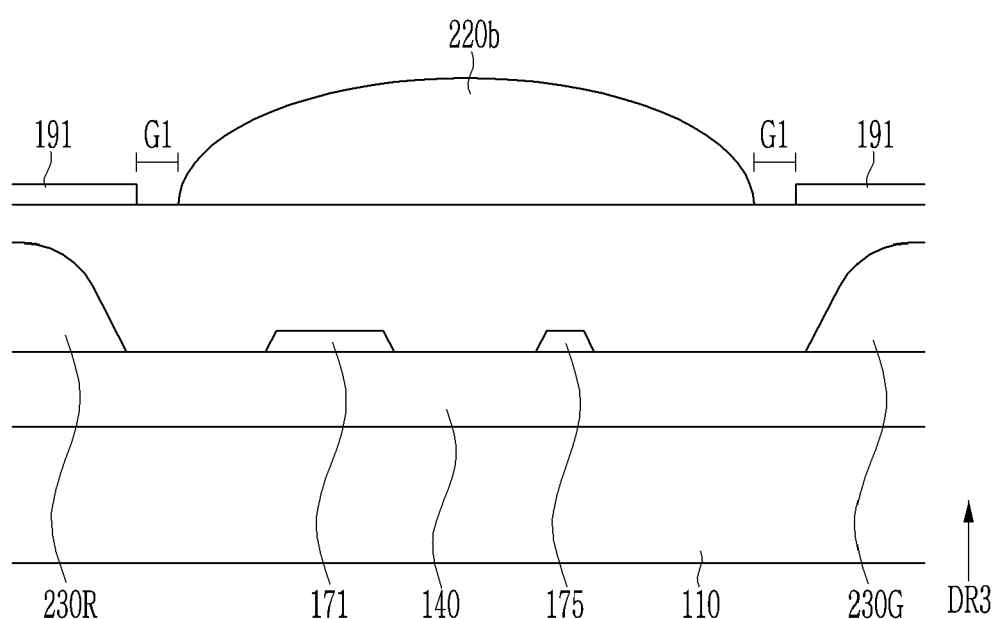
FIG. 3 is a cross-sectional view of FIG. 1, taken along the line III-III.

FIG. 1 is a top plan view of a display device according to an exemplary embodiment of the present invention. FIG. 2 is a cross-sectional view of FIG. 1, taken along the line II-II. FIG. 3 is a cross-sectional view of FIG. 1, taken along the line III-III'.

The display device according to the present exemplary embodiment includes a plurality of gate lines 121 disposed on an insulation substrate 110 that is made of transparent glass or plastic.

The gate lines 121 transmit a gate signal and extend in a first direction DR1. Each gate line 121 includes a plurality of gate electrodes 124 protruding from the gate line 121. In addition, a storage electrode line 129 may be disposed on the same layer where the gate line 121 is disposed at a distance from the gate line 121. The storage electrode line 129 may be separated from the gate line 121 and is thus provided as an island.

A gate insulating layer 140 that is made of an insulation material such as a silicon oxide or a silicon nitride is disposed on the gate line 121 and the storage electrode line 129. The gate insulating layer 140 may have a multi-layered structure including two insulation layers, each having a different physical property.

A plurality of semiconductor layers 154 are disposed on the gate insulating layer 140. The semiconductor layers 154 may overlap the gate electrode 124.

Next, a plurality of data lines 171, a plurality of source electrodes 173 connected to the data lines 171, and a plurality of drain electrodes 175 are formed on the semiconductor layer 154 and the gate insulating layer 140.

The data lines 171 transmit the data signal and cross the gate lines 121 while extending in a second direction DR2. The source electrodes 173 extend from the data line 171 and thus overlap the gate electrode 124, and may be formed substantially in the shape of a "U".

The drain electrode 175 is separated from the data line 171, and extends upward from a center of the U-shaped source electrode 173.

One gate electrode 124, one source electrode 173, and one drain electrode 175 form one thin film transistor (TFT) together with the semiconductor layer 154, and a channel region of the thin film transistor is formed in the semiconductor layer 154 disposed between the source electrode 173 and the drain electrode 175.

Next, a plurality of color filters 230 are disposed on the data line 171. The color filters 230 may include a red color filter 230R, a green color filter 230G, and a blue color filter 230B. Each color filter may be disposed in each area partitioned by crossing of the plurality of gate lines 121 and data lines 171.

Referring to FIG. 2, color filters that represent different colors may partially overlap each other in an area where the thin film transistor is disposed. When the color filters are overlapped with each other, the total thickness of the color filter of the corresponding area can be increased, and the corresponding area can be used like a spacer. Although it is not illustrated in FIG. 2 that the color filter is thickened in the overlap area, the thickness of the color filter 230 may become thicker in the area where the color filters overlap.

Next, an insulation layer 180 is disposed. The insulation layer 180 may be formed of an inorganic insulation material such as a silicon nitride or a silicon oxide, an organic insulation material, or a low dielectric constant material. For example, the insulation layer 180 may be an organic layer, and a thickness of the organic layer may be about 2 µm to about 3 µm. When the thickness of the insulation layer which is an organic layer is about 2 µm to about 3 µm, a pixel electrode 191 can be prevented from being broken due to a stress change during a process, and this will be described in detail later.

The insulation layer 180 and the color filters 230 include a contact hole 181 that overlaps the drain electrode 175. The pixel electrode 191 is physically and electrically connected with the drain electrode 175 through the contact hole 181, and receives a data voltage from the drain electrode 175.

The pixel electrode 191 may include a transparent conductor such as ITO or IZO.

The pixel electrode 191 may include a stem portion 192 extending in a first direction and minute branch portions 193 extended from the stem portion 192. Edges of the minute branch portions 193 may be connected with each other. The pixel electrode 191 includes a protrusion portion 195 overlapping the drain electrode 175, and may be connected with the drain electrode 175 in the protrusion portion 195.

The minute branch portion 193 of the pixel electrode 191 may have a thicker thickness in an area where the data line 171 and the gate line 121 overlap than a minute branch portion 193 in other areas. When the minute branch portion 193 has a thicker thickness at an edge of the pixel electrode 191, a phenomenon in which the pixel electrode 191 is broken at the edge thereof may be partially prevented.

A light blocking member 220 may be disposed on the pixel electrode 191. The light blocking member 220 may be disposed while overlapping the data line 171 along the second direction DR2.

The light blocking member 220 includes a first region 220a and a second region 220b. The first region 220a has a wider width D1 in the first direction compared to the second region 220b. The first region 220a may overlap the gate line 121, and the second region 220b may not overlap the gate line 121. A width of the second region 220b of the light blocking member 220 may be about 50 μm to about 55 μm. In addition, a width of the first region 220a may be about 60 μm to about 70 μm. Further, the width of the first region 220a may be about 5% to 20% wider than that of the second region 220b.

The second region 220b of the light blocking member 220 may not overlap one edge of the second region 220b. Referring to FIG. 3, the second region 220b of the light blocking member 220 and the edge of the pixel electrode 191 are separated from each other rather than being overlapped with each other. In this case, a distance G1 between the second region 220b of the light blocking member 220 and the edge of the pixel electrode 191 may be about 2 μm to 10 μm.

As described, the light blocking member 220 and the pixel electrode 191 are disposed to be separated from each other rather than being overlapped with each other such that generation of cracks at the edge of the pixel electrode 191 can be prevented or reduced.

The first region 220a of the light blocking member 220 is wider than the second region 220b in the first direction DR1. The first region 220a may overlap the gate line 121. Since the width of the first region 220a is wider than that of the second region 220b, generation of light leakage at the edge of the pixel electrode 191 can be prevented or reduced.

Figure 4:
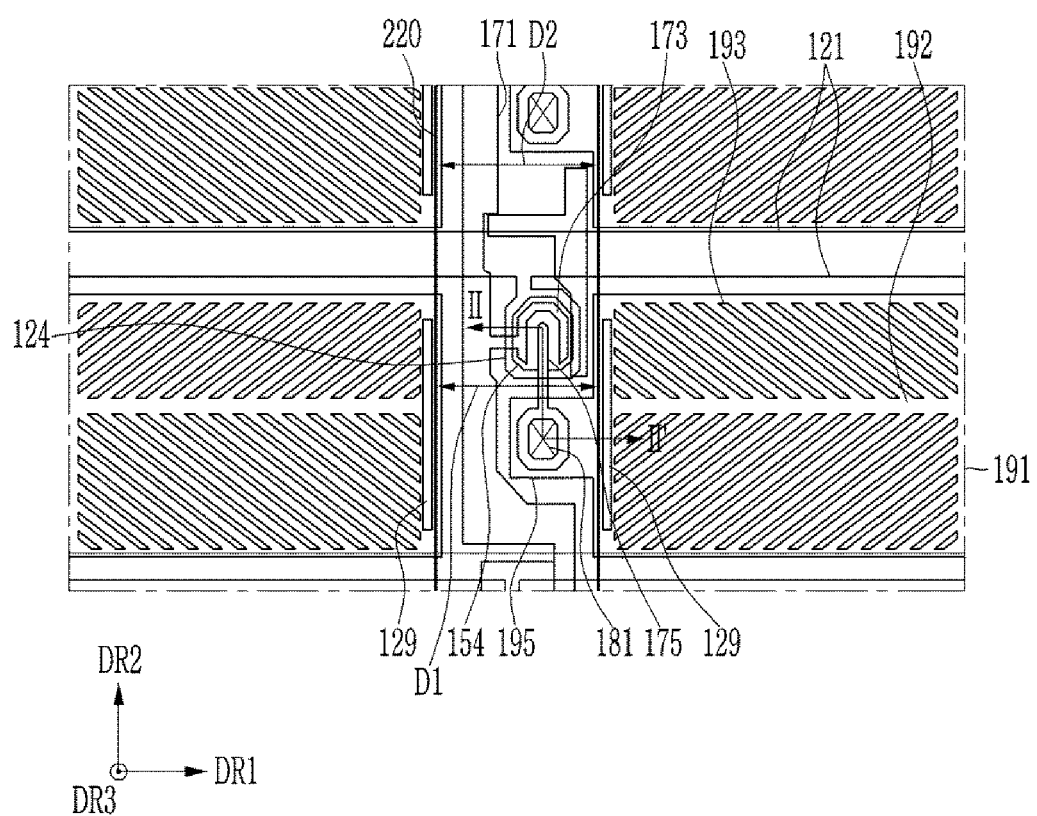
FIG. 4 shows a display device according to another exemplary embodiment of the present invention.

FIG. 4 shows a display device according to another exemplary embodiment of the present invention. Referring to FIG. 4, a light blocking member 220 according to the present exemplary embodiment has a uniform thickness in the entire area, and the light blocking member 220 and one edge of a pixel electrode 191 overlap with each other. However, in FIG. 4, a thickness of an insulation layer 180, which is an organic layer, is about 2 μm to about 3 μm. A cross-section taken along the line II-II' of FIG. 4 is the same as FIG. 2. Referring to FIG. 2, a thickness of the insulation layer 180, which is an organic layer, may be about 2 μm to about 3 μm. In this case, the insulation layer 180, which is an organic layer, absorbs a stress change during deposition and baking processes of the pixel electrode 191, and thus breakage of the pixel electrode 191 due to such a stress change can be prevented or reduced.

That is, in the display device according to the present exemplary embodiment, the light blocking member 220 includes a first region 220a and a second region 220b, each having a different width, and an edge of the pixel electrode 191 does not overlap the light blocking member 220 such that the pixel electrode 191 can be prevented from being broken. Alternatively, the insulation layer 180 is formed of an organic layer of about 2 μm to about 3 μm absorbs a stress change of the pixel electrode 191 to thereby prevent or reduce breakage of the pixel electrode 191. Alternatively, the insulation layer 180 is formed of an organic layer of about 2 μm to about 3 μm while preventing an edge of the pixel electrode 191 and the light blocking member 220 from being overlapped with each other, thereby preventing breakage of the pixel electrode 191.

Next, an effect of a display device according to an exemplary embodiment of the present invention will be described through detailed experimental data.

Figure 5:
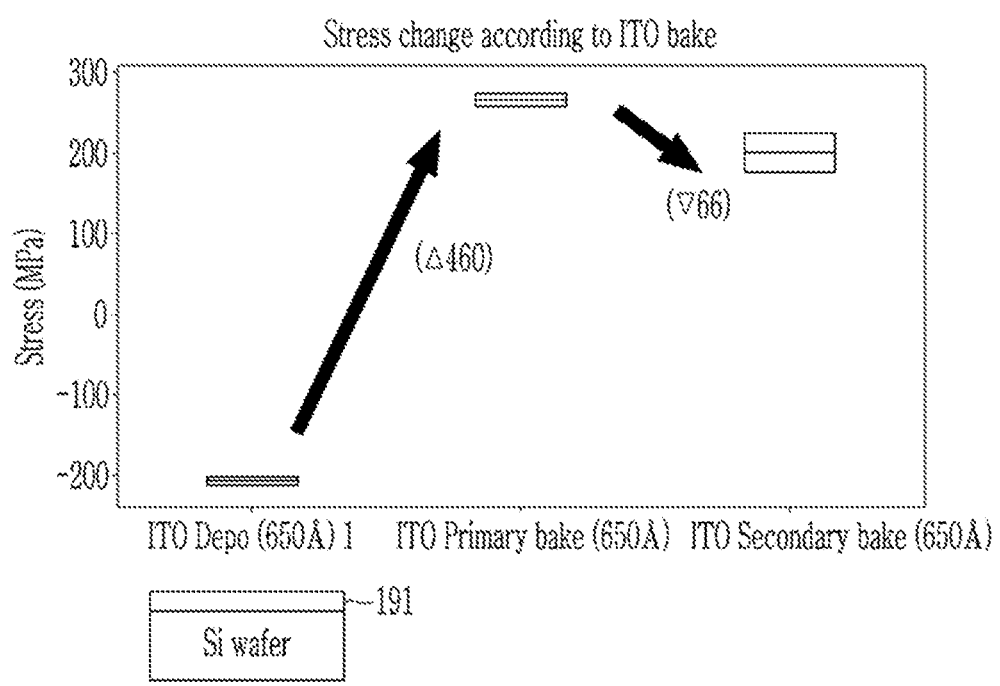
FIG. 5 illustrates a stress behavior according to baking of ITO, which is a constituent element of a pixel electrode.

FIG. 5 shows stress behavior according to baking of ITO, which is a constituent substance of a pixel electrode 191. Referring to FIG. 5, when ITO (i.e., a constituent substance of a pixel electrode) is deposited on a Si wafer, a stress value is −200, but when the deposited ITO is baked, the stress increases to about +260. Thus, the amount of stress change in the above process reaches Δ460. Next, when secondary baking is carried out, the stress is slightly reduced and thus the amount of stress change is Δ66. That is, the amount of stress change is great during deposition and baking processes of the pixel electrode 191, such a stress change causes generation of cracks in the pixel electrode 191.

Figure 6:
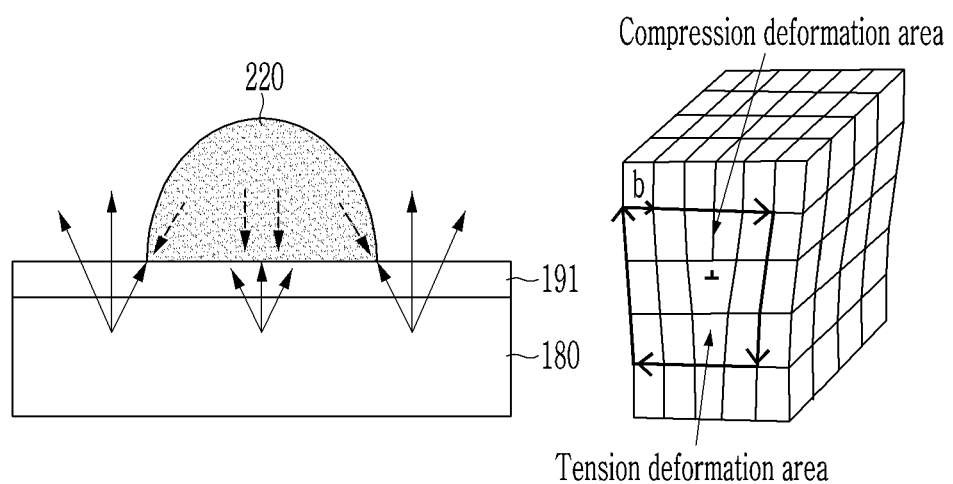
FIG. 6 shows a stress between an insulation layer, a pixel electrode, and a light blocking member.

The generation of cracks is further triggered by a stress difference with the light blocking member 220, which is an organic layer disposed in an upper portion of the pixel electrode 191. FIG. 6 shows stress between the insulation layer 180, the pixel electrode 191, and the light blocking member 220. Referring to FIG. 6, the pixel electrode 191 receives tensile stress from the insulation layer 180 and receives compression stress from the light blocking member 220, and a stress difference therebetween causes breakage of the pixel electrode 191.

However, in the display device according to the present disclosure, the pixel electrode 191 and the light blocking member 220 do not overlap each other, or a thickness of an organic insulation layer disposed below the pixel electrode 191 is set to be about 2 μm to about 3 μm, to thereby prevent or reduce breakage of the pixel electrode 191.

Figure 7:
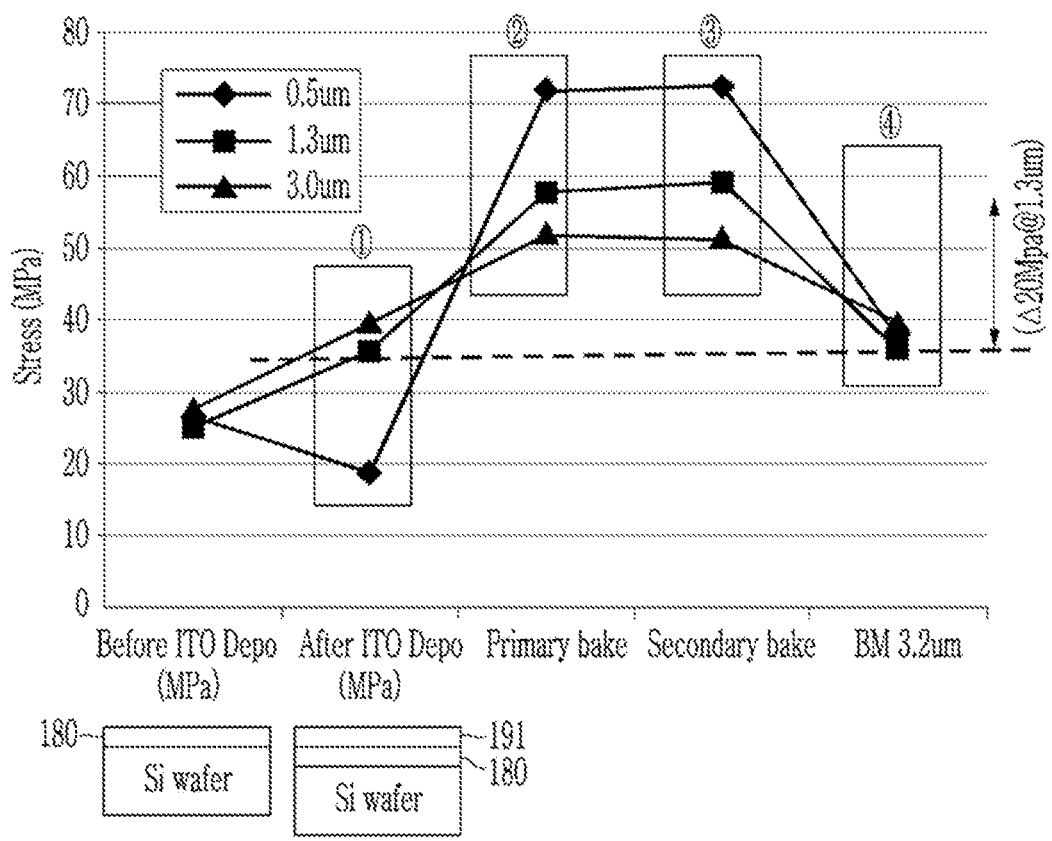
FIG. 7 shows measurement of a stress behavior from sequential deposition of an insulation layer and a pixel electrode on a Si wafer, and two baking processes, to form a light blocking member BM.

FIG. 7 shows measurement of a stress behavior from sequential deposition of the insulation layer 180 and the pixel electrode 191 on the Si wafer, and two baking processes, to form a light blocking member BM. In this case, the insulation layer 180, which is an organic layer, was set to 0.5 μm, 1.3 μm, and 3 μm, and a stress behavior at each stage was measured and the measurement results are shown in FIG. 7.

Referring to FIG. 7, it was determined that when the thickness of the insulation layer 180, which is an organic layer, was 0.5 μm, the amount of stress change at each stage was large. However, when the thickness of the insulation layer 180 was 1.3 μm, the amount of stress change is smaller than 0.5 μm, and when the thickness of the insulation layer 180 was 3.0 μm, the amount of stress behavior was significantly reduced. That is, when the insulation layer 180 was formed as an insulation layer having a thickness of about 2.0 μm to about 3.0 μm, the organic layer absorbs the amount of stress change during the deposition and baking processes of the pixel electrode 191 such that the amount of stress change in the entire layered structure was reduced. Accordingly, breakage of the pixel electrode 191 due to stress change can be prevented or reduced.

Figure 8:
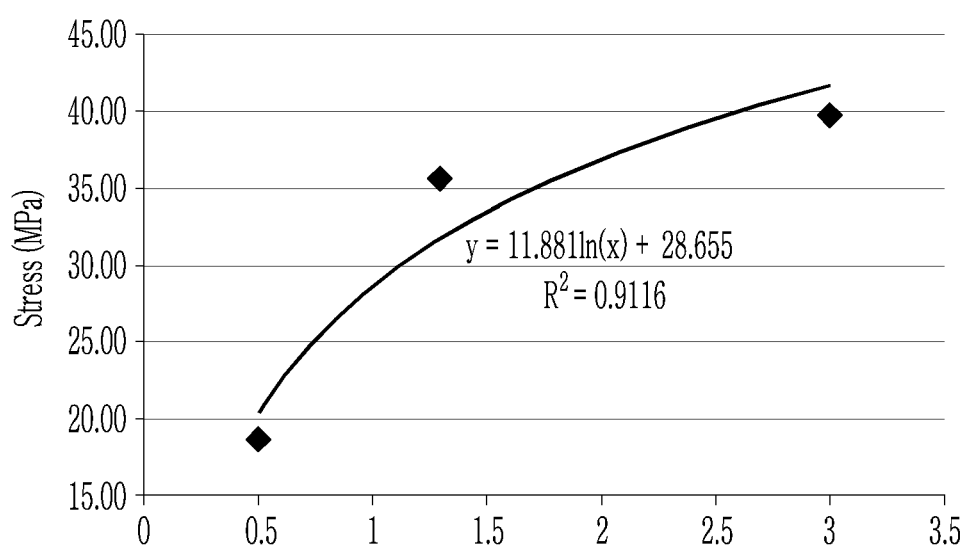
FIG. 8 shows a correlation between a thickness (μm) of the organic layer and stress of the pixel electrode.
Figure 9:
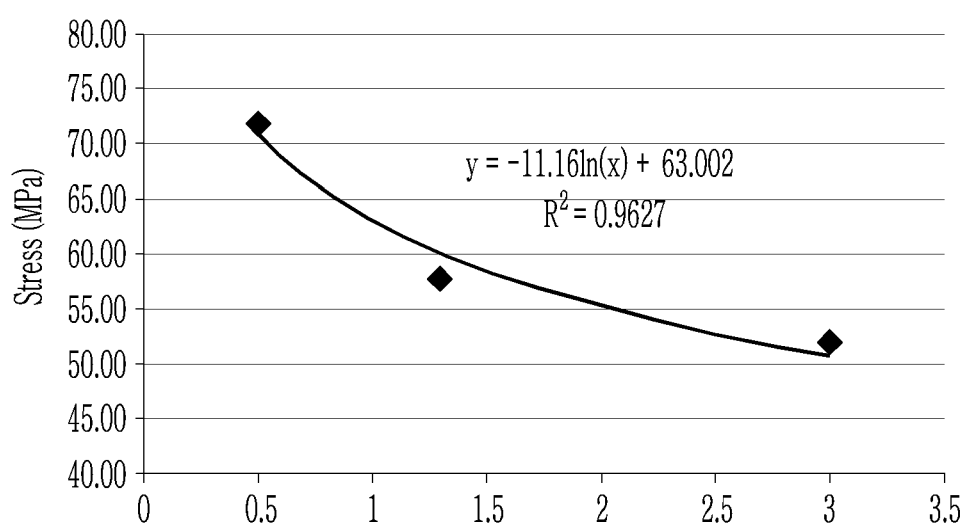
FIG. 9 shows a stress change after baking the pixel electrode, while differentiating a distance between the light blocking member and the pixel electrode.

FIG. 8 shows a correlation between a thickness (μm) of the organic layer and stress of the pixel electrode. FIG. 9 shows a stress change according to a distance (μm) between the light blocking member and the pixel electrode. Referring to FIG. 8, when the thickness of the organic layer is about 2 μm to about 3 μm, stress after deposition of the pixel electrode was approximately 35 MPa to 40 MPa. When the stress after the pixel electrode deposition is 35 MPa to 40 MPa, a stress change due to the baking process or forming of the light blocking member can be minimized.

Accordingly, when the thickness of the insulation layer, which is an organic layer, is about 2 μm to about 3 μm, breakage of the pixel electrode due to a deposition process, a baking process, and a process for forming a light blocking member can be minimized.

In addition, FIG. 9 shows measurement of stress change after baking the pixel electrode while differentiating a distance between the light blocking member and an edge of the pixel electrode. Referring to FIG. 9, it can be determined that stress is reduced as a distance between the pixel electrode and the light blocking member is increased. That is, referring to FIG. 9, the minimum distance for reducing stress after baking the pixel electrode is about 2 μm or more.

As described above, in the display device according to the present disclosure, the light blocking member 220 includes the first region 220a and the second region 220b, each having a different width, edges of the pixel electrode and the light blocking member 220 do not overlap each other, and the insulation layer 180 is formed as an organic layer having a thickness of about 2 μm to about 3 μm, while preventing the edge of the pixel electrode 191 and the light blocking member 220 from overlapping each other, such that breakage of the pixel electrode 191 during the deposition process, the baking process, and the process for forming the light blocking member can be prevented or reduced.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skilled in the art.

What is claimed is:

1. A display device comprising:
a substrate;
a gate line that is disposed on the substrate in a first direction;
a data line that is disposed in a second direction intersecting the gate line;
a semiconductor layer that is disposed between the gate line and the data line,
a transistor formed by the semiconductor layer, a part of the gate line, and a part of the data line,
a pixel electrode connected with the transistor; and
a light blocking member disposed on and overlapping the pixel electrode,
wherein the light blocking member extends linearly substantially only in the second direction while overlapping the data line without extending in the first direction and without intersecting any other light blocking member,
the light blocking member comprises a first region and a second region forming a substantially linear, elongated line having first and second widths, respectively, in the first direction,
the second width being narrower than the first width,
some portions of the gate line disposed adjacent to the pixel electrode do not overlap the light blocking member,
the gate line intersects the light blocking member, and
the gate line overlaps the light blocking member only in the intersecting region.

2. The display device of claim 1, wherein the first region overlaps the gate line and the second region overlaps the transistor.

3. The display device of claim 1, wherein the second region of the light blocking member and the pixel electrode are disposed apart from each other in the first direction, and a distance therebetween is about 2 μm to about 10 μm.

4. The display device of claim 1, wherein a width of the first region of the light blocking member in the first direction is about 5% to about 20% wider than a width of the second region in the first direction.

5. The display device of claim 1, wherein a width of the first region of the light blocking member in the first direction is about 60 μm to about 70 μm.

6. The display device of claim 1, wherein a width of the second region of the light blocking member in the first direction is about 50 μm to about 55 μm.

7. The display device of claim 1, wherein the second region of the light blocking member does not overlap one edge of the pixel electrode.

8. The display device of claim 1, wherein the pixel electrode comprises a stem portion extending in the first direction and minute branch portions extended from the stem portion, and
a length of the pixel electrode in the first direction is longer than a length of the pixel electrode in the second direction.

9. The display device of claim 1, further comprising an insulation layer disposed between the data line and the pixel electrode.

10. The display device of claim 9, wherein the insulation layer is an organic layer, and a thickness of the insulation layer is about 2 μm to about 3 μm.

11. The display device of claim 9, further comprising a color filter disposed between the insulation layer and the data line.

12. A display device comprising:
a substrate;
a gate line that is disposed on the substrate in a first direction;
a data line that is disposed in a second direction intersecting the gate line;
a semiconductor layer that is disposed between the gate line and the data line,
a transistor formed by the semiconductor layer, a part of the gate line, and a part of the data line,
a pixel electrode connected with the transistor; and
a light blocking member disposed on and overlapping the pixel electrode,
wherein the light blocking member extends linearly substantially only in the second direction while overlapping the data line without extending in the first direction and without intersecting any other light blocking member,
the light blocking member and the pixel electrode are disposed a distance apart from each other in the first direction,
the light blocking member comprises a first region and a second region forming a substantially linear, elongated line having first and second widths, respectively, in the first direction,
some portions of the gate line disposed adjacent to the pixel electrode do not overlap the light blocking member,
the gate line intersects the light blocking member, and
the gate line overlaps the light blocking member only in the intersecting region.

13. The display device of claim 12, wherein the distance apart is about 2 μm to about 10 μm.

14. The display device of claim 12, further comprising an insulation layer that is disposed between the data line and the pixel electrode.

15. The display device of claim 14, wherein the insulation layer is an organic layer, and the insulation layer has a thickness of about 2 µm to about 3 µm.

16. The display device of claim 14, further comprising a color filter that is disposed between the insulation layer and the data line.

17. A display device comprising:
a substrate;
a gate line that is disposed on the substrate in a first direction;
a data line disposed in a second direction intersecting the gate line;
a semiconductor layer that is disposed between the gate line and the data line,
a transistor formed by the semiconductor layer, a part of the gate line, and a part of the data line,
a pixel electrode connected with the transistor;
an insulation layer that is disposed between the transistor and the pixel electrode; and
a light blocking member disposed on and overlapping the pixel electrode,
wherein a thickness of the insulation layer is about 2 µm to about 3 µm,
wherein the light blocking member extends linearly substantially only in the second direction while overlapping the data line without extending in the first direction and without intersecting any other light blocking member,
the light blocking member comprises a first region and a second region forming a substantially linear, elongated line having first and second widths, respectively, in the first direction,
the gate line intersects the light blocking member, and
the gate line overlaps the light blocking member only in the intersecting region.

18. The display device of claim 17, further comprising a color filter that is disposed between the insulation layer and the data line.

19. The display device of claim 17, wherein the insulation layer is an organic layer.

20. The display device of claim 17, wherein the second region and the pixel electrode are disposed apart from each other in the first direction, and
a distance therebetween is about 2 µm to about 10 µm.

* * * * *